US010136235B2

(12) United States Patent
Kang

(10) Patent No.: US 10,136,235 B2
(45) Date of Patent: Nov. 20, 2018

(54) METHOD AND SYSTEM FOR AUDIO QUALITY ENHANCEMENT

(71) Applicant: LINE Corporation, Shinjuku-ku, Tokyo (JP)

(72) Inventor: In Gyu Kang, Seongnam-si (KR)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/654,843

(22) Filed: Jul. 20, 2017

(65) Prior Publication Data

US 2018/0035231 A1 Feb. 1, 2018

(30) Foreign Application Priority Data

Jul. 26, 2016 (KR) ........................ 10-2016-0095045

(51) Int. Cl.
*H04B 3/20* (2006.01)
*H04S 3/00* (2006.01)
*H04S 7/00* (2006.01)
*H04R 5/033* (2006.01)

(52) U.S. Cl.
CPC ................ *H04S 3/002* (2013.01); *H04S 7/30* (2013.01); *H04S 7/308* (2013.01); *H04R 5/033* (2013.01); *H04S 2400/01* (2013.01); *H04S 2400/05* (2013.01)

(58) Field of Classification Search
CPC . H04S 3/002; H04S 7/30; H04S 7/308; H04S 2400/01; H04S 2400/05; H04R 5/033
USPC .............. 381/56, 57, 58, 66, 71.1, 94.1, 124
See application file for complete search history.

(56) References Cited

U.S. PATENT DOCUMENTS

| | | | | |
|---|---|---|---|---|
| 6,539,091 | B1 * | 3/2003 | Schertler ................. | H04M 9/08 379/390.01 |
| 6,785,339 | B1 * | 8/2004 | Tahernezhaadi .... | H04W 88/181 370/286 |
| 8,705,758 | B2 * | 4/2014 | Alves .................... | H04M 9/082 381/66 |
| 2011/0082690 | A1 | 4/2011 | Togami et al. | |
| 2013/0260893 | A1 | 10/2013 | Shin et al. | |
| 2013/0332543 | A1 | 12/2013 | Shin et al. | |

(Continued)

FOREIGN PATENT DOCUMENTS

| | | | |
|---|---|---|---|
| CN | 102036158 | A | 4/2011 |
| JP | 2010056778 | A | 3/2010 |
| JP | 2011080868 | A | 4/2011 |

(Continued)

OTHER PUBLICATIONS

Korean Office Action dated Jun. 20, 2017 for corresponding Korean Patent Application No. 10-2016-0095045.

*Primary Examiner* — William A Jerez Lora
(74) *Attorney, Agent, or Firm* — Harness, Dickey & Pierce, P.L.C.

(57) ABSTRACT

Provided is a method and system for audio quality enhancement. The audio quality enhancement method may include determining whether a software audio quality enhancement function is desired and/or required by analyzing a microphone input signal that is input to the electronic device and a speaker output signal that is output from the electronic device; and activating or inactivating the software audio quality enhancement function based on a result of determining whether the software audio quality enhancement function is desired and/or required.

16 Claims, 5 Drawing Sheets

(56) References Cited

U.S. PATENT DOCUMENTS

| | | | | |
|---|---|---|---|---|
| 2014/0019540 | A1 | 1/2014 | Shin et al. | |
| 2015/0023514 | A1 * | 1/2015 | Shi | G10L 21/02 381/66 |

FOREIGN PATENT DOCUMENTS

| | | | |
|---|---|---|---|
| KR | 20130001306 | A | 1/2013 |
| WO | WO-2014115290 | A1 | 7/2014 |
| WO | WO-2015/0065001 | A1 | 5/2015 |

* cited by examiner

METHOD AND SYSTEM FOR AUDIO QUALITY ENHANCEMENT

CROSS-REFERENCE TO RELATED APPLICATION(S)

This U.S. non-provisional application claims the benefit of priority under 35 U.S.C. § 119 to Korean Patent Application No. 10-2016-0095045 filed on Jul. 26, 2016, in the Korean Intellectual Property Office (KIPO), the entire contents of which are incorporated herein by reference.

BACKGROUND

Field

One or more example embodiments relate to a method, apparatus, system, and/or non-transitory computer readable medium for audio quality enhancement.

Description of Related Art

Currently, various types of multimedia devices have been released and a variety of applications for supporting the multimedia devices have been developed. Among such various applications, an application using an audio signal coming in through a microphone included in a multimedia device uses an audio quality enhancement function since echo coming from a speaker and surrounding noise flow in a microphone with a voice input of a user. A representative application may be, for example, an application for a telephone or karaoke, an application for recording voice or an image, an application for recognizing voice or music, and the like.

In the meantime, the current multimedia devices include a multimedia device that enables hardware itself to provide an audio quality enhancement function. Types of and a number of multimedia devices that enable hardware itself to provide the audio quality enhancement function as above are on the increase. Also, some applications need to provide the audio quality enhancement function in a software manner.

Since the audio quality enhancement function removes echo and noise from an input that comes into a microphone, damage may occur in a voice input of a user. In addition, once the audio quality enhancement function is performed a plurality of number of times, the damage may be deepened. Accordingly, developers of applications that need to provide a software audio quality enhancement function need to manually verify multimedia devices that enable hardware itself to provide the audio quality enhancement function and to generate and manage a list of the multimedia devices. Also, a related function needs to be turned off to prevent an application installed on multimedia devices that provide a hardware audio quality enhancement function from providing the software audio quality enhancement function.

Alternatively, all of the hardware audio quality enhancement function and the software audio quality enhancement function may be activated to avoid such inconveniences. However, in this case, the damage of audio quality may be deepened.

SUMMARY

One or more example embodiments provide a method, apparatus, system, and/or non-transitory computer readable medium for audio quality enhancement that may selectively activate or deactivate a software audio quality enhancement function by analyzing a microphone input signal and a speaker output signal and by determining whether the software audio quality enhancement function is desired and/or required in real time.

At least one example embodiment provides a non-transitory computer-readable recording medium storing computer readable instructions that, when executed by at least one processor included in an electronic device, causes the at least one processor to perform an audio quality enhancement method, the method including analyzing a microphone input signal that is input to the electronic device and a speaker output signal that is output from the electronic device, determining whether a software audio quality enhancement function is desired based on results of the analyzing the microphone input signal and the speaker output signal, and activating the software audio quality enhancement function based on a result of the determining whether the software audio quality enhancement function is desired.

At least one example embodiment provides a method for audio quality enhancement, the method including analyzing, using at least one processor, a microphone input signal that is input to an electronic device and a speaker output signal that is output from the electronic device, determining, using the at least one processor, whether a software audio quality enhancement function is desired based on results of the analyzing the microphone input signal and the speaker output signal, and activating, using the at least one processor, the software audio quality enhancement function based on a result of determining whether the software audio quality enhancement function is desired.

At least one example embodiment provides an electronic device including a memory configured to store computer-readable instructions; and at least one processor configured to execute the computer-readable instructions. The at least one processor is configured to analyze a microphone input signal that is input to the electronic device and a speaker output signal that is output from the electronic device, determine whether a software audio quality enhancement function is desired based on results of the analyzing the microphone input signal and the speaker output signal, and activate the software audio quality enhancement function based on a result of the determining whether the software audio quality enhancement function is desired.

According to some example embodiments, it is possible to selectively activate or deactivate a software audio quality enhancement function by analyzing a microphone input signal and a speaker output signal and by determining whether the software audio quality enhancement function is desired and/or required in real time.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
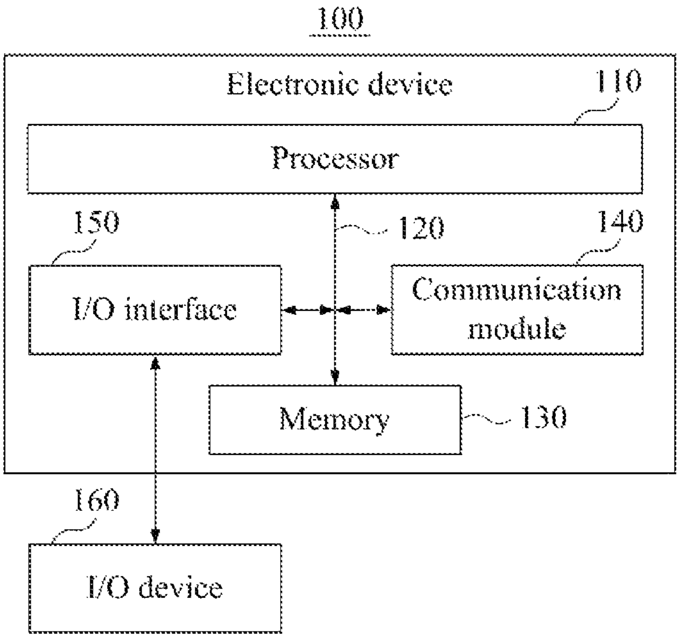
FIG. 1 is a diagram illustrating an example of a configuration of an electronic device according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An audio quality enhancement system according to some example embodiments may be configured through an electronic device described below, and an audio quality enhancement method according to some example embodiments may be performed through the electronic device. For example, an application configured as a computer program according to some example embodiments may be installed and executed on the electronic device. The electronic device may perform the audio quality enhancement method under control of the executed application.

Here, the electronic device may be a fixed terminal or a mobile terminal configured as a computer device. For example, the electronic device may be a smartphone, a mobile phone, a personal navigation device, a computer, a laptop computer, a digital broadcasting terminal, a personal digital assistant (PDA), a portable multimedia player (PMP), a tablet personal computer (PC), a gaming console, an Internet of Things (IoD) device, a virtual reality device, an augmented reality device, and the like, and may include at least one processor, at least one memory, and a permanent storage device for storing data.

FIG. 1 illustrates an example of a configuration of an electronic device according to at least one example embodiment. Referring to FIG. 1, an electronic device 100 may include at least one processor 110, a bus 120, a memory 130, a communication module 140, and an input/output (I/O) interface 150, etc., but is not limited thereto.

The processor 110 may be configured to process computer-readable instructions by performing basic arithmetic operations, logic operations, and I/O operations. The computer-readable instructions may be provided from the memory 130 and/or the communication module 140 to the processor 110 through the bus 120. For example, the processor 110 may be configured to execute received instructions in response to the program code stored on the storage device, such as the memory 130, or execute instructions received over a network through the communication module 140.

The bus 120 enables communication and data transmission between components of the electronic device 100. For example, the bus 120 may be configured using a high-speed serial bus, a parallel bus, a storage area network (SAN) and/or another appropriate communication technique.

The memory 130 may include a permanent mass storage device, such as random access memory (RAM), read only memory (ROM), a disk drive, etc., as a non-transitory computer-readable storage medium. Here, ROM and a permanent mass storage device may be included in the electronic device 100 as a separate permanent storage separate from the memory 130. Also, an OS and at least one program code (e.g., computer-readable instructions), for example, a code for browser installed and executed on the electronic device 100, an application installed on the electronic device 100 for providing a specific service, etc., may be stored in the memory 130. Such software components may be loaded from another non-transitory computer-readable storage medium separate from the memory 130 using a drive mechanism, a network device (e.g., a server, another electronic device, etc.), etc. The other non-transitory computer-readable storage medium may include, for example, a floppy drive, a disk, a tape, a Bluray/DVD/CD-ROM drive, a memory card, etc. According to other example embodiments, software components may be loaded to the memory 130 through the communication module 140, instead of, or in addition to, the non-transitory computer-readable storage medium. For example, at least one computer program, for example, the application, installed by files provided over the network from developers or a file distribution system that provides an installation file of the application may be loaded to the memory 130.

The communication module 140 may be at least one computer hardware component for connecting the electronic device 100 to at least one computer network (e.g., a wired and/or wireless network, etc.). For example, the communication module 140 may provide a function for communication between the electronic device 100 and another electronic device over the network. Here, a communication scheme using the computer network is not particularly limited and may include a communication scheme that uses a near field communication between devices as well as a communication method using a communication network, for example, a mobile communication network, the wired Internet, the wireless Internet, a broadcasting network, a radio network, etc. For example, the computer network may include at least one of network topologies that include networks, for example, a personal area network (PAN), a local area network (LAN), a campus area network (CAN), a metropolitan area network (MAN), a wide area network (WAN), a broadband network (BBN), the Internet, and the like. Also, the computer network may include at least one of a bus network, a star network, a ring network, a mesh network, a star-bus network, a tree or hierarchical network, and the like. However, it is only an example and the example embodiments are not limited thereto.

The I/O interface 150 may be a device used for interface with the I/O device 160. For example, the input device may include a keyboard, a mouse, a microphone, a camera, etc., and an output device may include a device, such as a display, a speaker, etc. As another example, the I/O interface 150 may be a device for interface with an apparatus in which an input function and an output function are integrated into a single function, such as a touch screen. Depending on example embodiments, the I/O device 160 may be configured to communicate with the electronic device 100 as a separate component and may be configured as a single device that is included in the electronic device 100. For example, there may be an example embodiment in which a microphone and a speaker are connected to a main body of a PC, and an example embodiment in which a microphone and a speaker are included in a main body of a smartphone.

When processing instructions of the computer program loaded to the memory 130, the processor 110 of the electronic device 100 may control the electronic device 100 to process various types of signals and information input to the electronic device 100 through an input device, such as a keyboard, a mouse, a microphone, a touch screen, and the like, and to display various types of signals or information, such as a service screen, content, an audio signal, and the like, on an output device, such as a display, a speaker, and the like, through the I/O interface 150.

According to other example embodiments, the electronic device 100 may include a greater or lesser number of components than a number of components shown in FIG. 1. For example, the electronic device 100 may include at least a portion of the I/O device 160, or may further include other components, for example, a transceiver, a global positioning system (GPS) module, a camera, a variety of sensors, a database, and the like. In detail, if the electronic device 100 is a smartphone, the electronic device 100 may be configured to further include a variety of components, for example, an accelerometer sensor, a gyro sensor, a camera, various physical buttons, a button using a touch panel, an I/O port, a motor for vibration, etc., which are generally included in the smartphone.

According to some example embodiments, the computer program installed on the electronic device 100 may selectively activate a software audio quality enhancement function by determining whether the software audio quality enhancement function is desired and/or required for the electronic device 100. Here, an audio quality enhancement function may be configured using an acoustic echo cancellation (AEC) module, a noise suppression (NS) module, an automatic gain control (AGC) module, and the like. The audio quality enhancement function is further described below.

Figure 2:
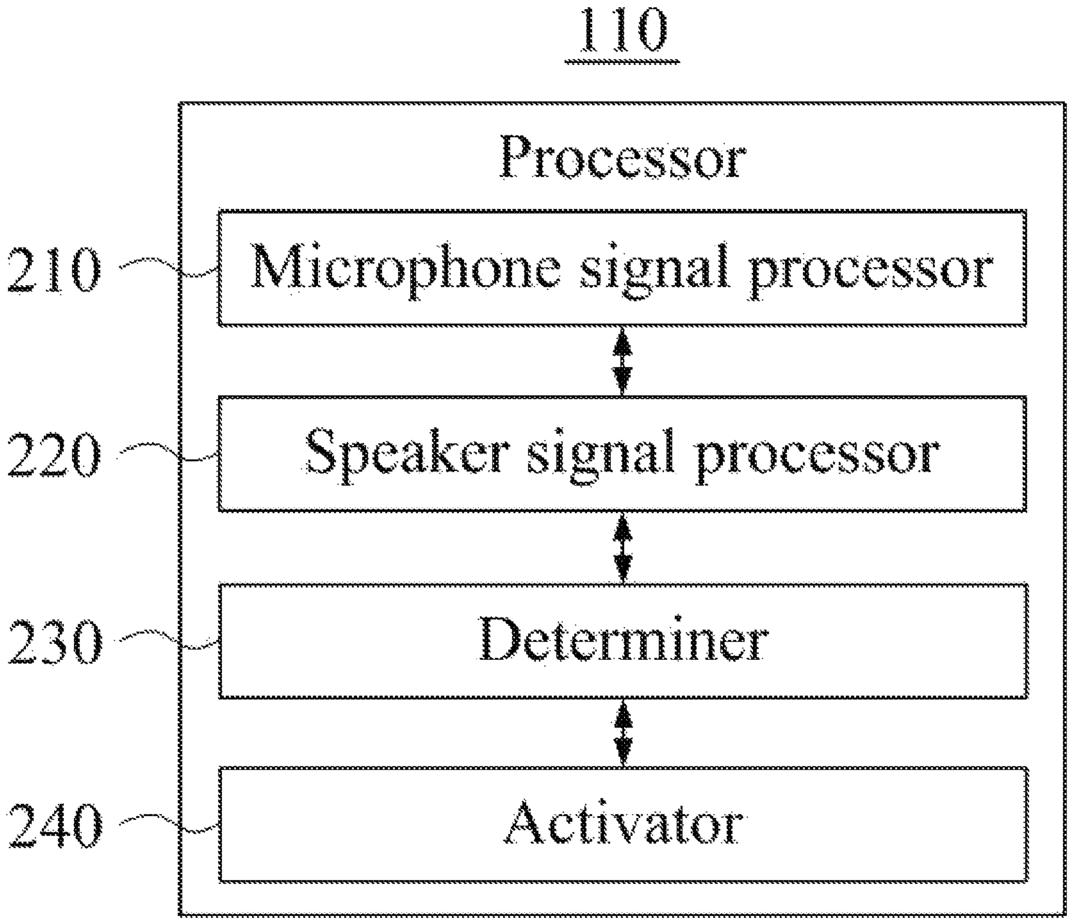
FIG. 2 is a block diagram illustrating an example of a configuration of a processor of an electronic device according to at least one example embodiment.
Figure 3:
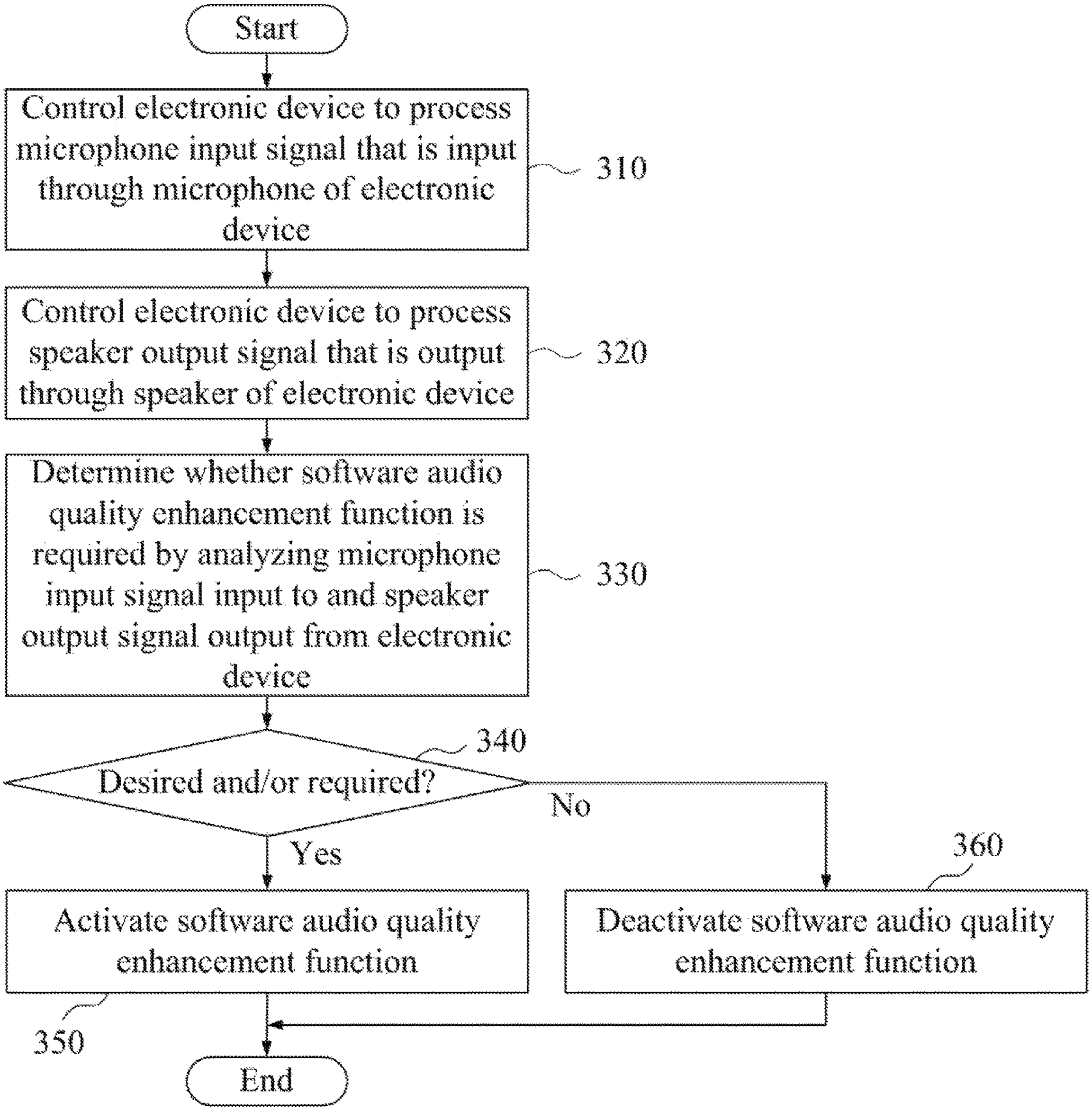
FIG. 3 is a flowchart illustrating an example of a method performed by an electronic device according to at least one example embodiment.

FIG. 2 is a block diagram illustrating an example of a configuration of at least one processor of an electronic device according to at least one example embodiment, and FIG. 3 is a flowchart illustrating an example of a method performed by an electronic device according to at least one example embodiment. As described above, an audio quality enhancement system according to some example embodiments may be configured in the electronic device 100. Referring to 2, the at least one processor 110 of the electronic device 100 may include a microphone signal processor 210, a speaker signal processor 220, a determiner 230, and/or an activator 240, but is not limited thereto.

Here, components of the processor 110 may be representations of different functions of the processor 110 that are performed by the processor 110 in response to a computer readable instruction provided from a code of a computer program (or a browser or an OS) installed and executed on the electronic device 100. For example, the microphone signal processor 210 may be used as a functional representation of the processor 110 that controls the electronic device 100 to process a microphone signal. Additionally, the components of the processor 110 may be hardware components of the processor that perform the functionality described below.

The processor 110 and the components of the processor 110 may be configured to execute computer readable instructions according to a code of at least one program or a code of the OS included in the memory 130. In particular, the processor 110 and the components of the processor 110 may control the electronic device 100 to perform operations 310 through 360 included in the audio quality enhancement method of FIG. 3.

In operation 310, the microphone signal processor 210 may control the electronic device 100 to process a microphone input signal that is input (e.g., received, etc.) through a microphone. Here, the microphone may be a component included in the electronic device 100 and/or a separate device connected to the electronic device 100 over a wired and/or wireless connection or network, for example, a phone connector (e.g., a stereo jack), a universal serial bus (USB), Bluetooth, WiFi, WiFi-Direct, NFC, and the like.

In operation 320, the speaker signal processor 220 may control the electronic device 100 to process a speaker output signal that is output through (e.g., transmitted to) a speaker of the electronic device 100. The speaker may be a component included in the electronic device 100 and/or a separate device connected to the electronic device 100 over a connection and/or the network.

In operation 330, the determiner 230 may determine whether a software audio quality enhancement function is desired and/or required by analyzing the microphone input signal that is input to the electronic device 100 and the speaker output signal that is output from the electronic device 100. A method of determining whether the software audio quality enhancement function is desired and/or required is further described with reference to FIG. 4.

Operation 340 enables operation 350 or 360 to be selectively performed based on a result of the determination made by the determiner 230 in operation 330. For example, when the software audio quality enhancement function is determined to be desired and/or required, the determiner 230 may transfer an instruction for activating the software audio quality enhancement function to the activator 240. Here, operation 350 may be performed. Inversely, when the software audio quality enhancement function is determined to not be desired and/or required, the determiner 230 may transfer an instruction for deactivating the software audio quality enhancement function to the activator 240, and operation 360 may be performed.

In operation 350, the activator 240 may activate the software audio quality enhancement function. For example, the software audio quality enhancement function may include an AEC module, an NS module, and an AGC module, etc., and each module may be configured as software executed by hardware (e.g., software executed by at least one processor, a FPGA, an ASIC, a SoC, etc.) and/or a special purpose hardware component configured to execute the functionality. In operation 330, whether a corresponding module is desired and/or required may be determined with respect to each of the AEC module, the NS module, and the AGC module. The activator 240 may selectively activate a module that is determined to be desired and/or required in operation 350.

In operation 360, the activator 240 may deactivate the software audio quality enhancement function. For example, when the software audio quality enhancement function is activated and also is determined to be undesired and/or unnecessary in operation 330, the activator 240 may deactivate the software audio quality enhancement function in operation 360. As described above, activation may be performed with respect to each of the AEC module, the NS module, and the AGC module, and deactivation may be performed with respect to each of the AEC module, the NS module, and the AGC module.

Determining whether the software audio quality enhancement function is desired and/or required and activation or deactivation of the software audio quality enhancement function may be repeated while an audio quality enhancement is desired and/or required based on the intent of an application installed on the electronic device 100. For example, operations 330 through 360 may be repeated until a separate termination instruction is input.

Figure 4:
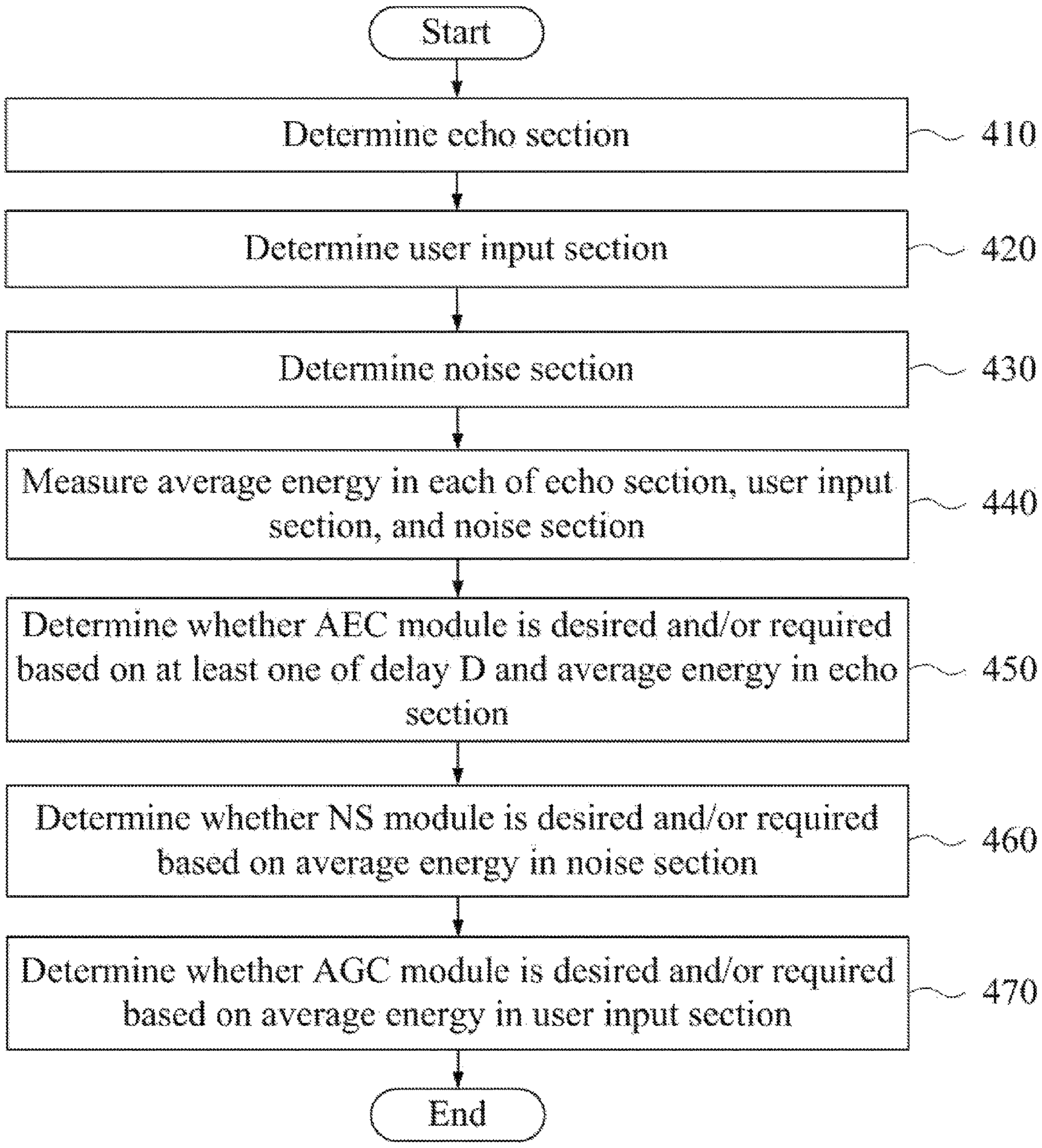
FIG. 4 is a flowchart illustrating an example of a method of determining whether a software audio quality enhancement function is desired and/or required according to at least one example embodiment.

FIG. 4 is a flowchart illustrating an example of a method of determining whether a software audio quality enhancement function is desired and/or required according to at least one example embodiment. Operations 410 through 470 of FIG. 4 may be included in operation 330 of FIG. 3. Hereinafter, a microphone input signal is referred to as "Y" and a speaker output signal is referred to as "X".

In operation 410, the determiner 230 may determine an echo section in audio that is received by the electronic device through the microphone.

The determiner 230 may determine the echo section through mutual correlation analysis between Y and X during an activation section of X (e.g., when desired audio is detected in the output signal X). A variety of methods, for example, voice activity detection (VAD), may be used to determine the activation section of X (e.g., when voice activity is detected in the output signal X). For example, sections of the output signal X having an average energy relatively greater than the average energy of X may be determined as the activation section of X. In other words, the determiner 230 may determine that a section (e.g., a portion) of the output signal X has been activated by determining whether the section has a higher average energy than a desired threshold, such as the average energy of the output signal X as a whole. One of several known various activation section determining methods, for example, VAD methods may be used to determine the activation section of X, that is, the speaker output signal, but the example embodiments are not limited thereto and other activation section determining methods may be used, such as detection of desired trigger noises (e.g., voice commands, trigger sounds, etc.), inputs from an input device (e.g., a key press, a touch input, a gesture input), etc.

The determiner 230 may divide X and Y based on a unit of time T that is a frame unit with a desired and/or preset size, for real-time processing. Here, energy Ex of divided X may be calculated according to Equation 1.

$$Ex_f = \sum_{n=f*T}^{(f+1)*T} x^2(n) \qquad \text{[Equation 1]}$$

In Equation 1, f denotes an index of a divided frame and T denotes a frame processing unit (e.g., a unit of time) with a desired and/or preset size. If the frame processing unit T is set as 10 msec and a sampling rate is 16,000 Hz, X may be divided into 160 sample frames.

Here, the average energy $\overline{Ex_f}$ of X may be calculated according to Equation 2.

$$\overline{Ex_f}=0.99\overline{Ex_{f-1}}+0.01Ex_f \quad \text{[Equation 2]}$$

If $Ex_f>\overline{Ex_f}$, $X_f$ may be an activation section.

The correlation analysis during the activation section of X may be performed using a mutual correlation function between Y and X as expressed by Equation 3.

$$\sum_{n=0}^{T} y(n)x(n-d) \quad \text{[Equation 3]}$$

In Equation 3, d denotes delay.

The delay d may be a negative number or a positive number, and the range of d may include an acoustic echo delay and/or a system delay. The acoustic echo delay may include a delay occurring in an acoustic environment until a signal is output from a speaker and input to a microphone. Also, the delay may include any delay, such as a device buffer delay, occurring in hardware and software until the signal input to the microphone is transferred to a correlation analysis end. That is, any type of delays occurring until the signal is received by the determiner 230 may be included in the system delay.

Normalized Equation 3 may be represented as Equation 4.

$$R(d)=\frac{\frac{1}{T}\sum_{n=0}^{T} y(n)x(n-d)}{\frac{1}{T}y^2(n)} \quad \text{[Equation 4]}$$

R(d) may have a relatively great value according to an increase in similarity between X and Y.

Here, d of an index having a maximum value among mutual correlation analysis results R(d) of two signals X and Y may indicate a delay D between the two signals X and Y as expressed by Equation 5.

$$D=arg\max(R(d)) \quad \text{[Equation 5]}$$

An echo section of the signal Y may be determined through R(D) (e.g., a portion of the input signal Y that includes an echo). If D continues with the same value during the activation section of X, the echo section may be defined as Equation 6 in a case in which x(n) is the activation section and D continues with the same value.

$$y(n+D) \quad \text{[Equation 6]}$$

If x(n) is a deactivation section or D is not maintained with the same value, y(n+D) of Equation 6 may represent a non-echo section.

In operation 420, the determiner 230 may determine a user input section.

The determiner 230 may determine an activation section of Y excluding the echo section.

For example, if energy $Ey_f$ of Y is greater than $\alpha*\overline{Ey_f}$, the determiner 230 may determine that $Y_f$ is the activation section and may determine the activation section as the user input section. Here, average energy $\overline{Ey_f}$ of Y may be calculated according to Equation 7 if $Y_f$ is determined as the user input section, and otherwise, may be calculated according to Equation 8. For example, α may be set to and/or preset to 2.0 as a first weight. However, it is provided as an example only and the example embodiments are not limited thereto. The aforementioned activation section determining method is not limited to the example embodiments.

$$\overline{Ey_f}=0.99\overline{Ey_{f-1}}+0.01Ey_f \quad \text{[Equation 7]}$$

$$\overline{Ey_f}=\overline{Ey_{f-1}} \quad \text{[Equation 8]}$$

In operation 430, the determiner 230 may determine a noise section (e.g., a section of the audio signal that includes undesired noise, such as undesired background noise).

For example, if the energy $EY_f$ of Y is less than $\beta*\overline{Ey_f}$ in a remaining section excluding the echo section and the user input section, the determiner 230 may determine $Y_f$ as the noise section. For example, β may be set and/or preset to 1 as a second weight, but is not limited thereto. Here, the noise section determining method and the coefficient are provided as examples only and are not limited to the example embodiments.

In operation 440, the determiner 230 may measure the average energy in each of the echo section, the user input section, and the noise section.

For example, the average energy $\overline{Eecho_f}$ the echo section may be calculated according to Equation 9 if $Y_f$ is determined as the echo section, and, otherwise, may be calculated according to Equation 10.

$$\overline{Eecho_f}=0.99\overline{Eecho_{f-1}}+0.0Ey_f \quad \text{[Equation 9]}$$

$$\overline{Eecho_f}=\overline{Eecho_{f-1}} \quad \text{[Equation 10]}$$

Also, the average energy $\overline{Euser_f}$ in the user input section may be calculated according to Equation 11 if $Y_f$ is determined as the user input section and, otherwise, may be calculated according to Equation 12.

$$\overline{Euser_f}=0.99\overline{Euser_{f-1}}+0.01Ey_f \quad \text{[Equation 11]}$$

$$\overline{Euser_f}=\overline{Euser_{f-1}} \quad \text{[Equation 12]}$$

Also, the average energy in the noise section may be calculated according to Equation 13 if $Y_f$ is determined as the noise section and, otherwise, may be calculated according to Equation 14.

$$\overline{Enoise_f}=0.99\overline{Enoise_{f-1}}+0.01Ey_f \quad \text{[Equation 13]}$$

$$\overline{Enoise_f}=\overline{Enoise_{f-1}} \quad \text{[Equation 14]}$$

The coefficients, 0.99 and 0.01, used to calculate the average energy in Equation 9, Equation 11, and Equation 13 are provided as examples only and the coefficients are not limited thereto.

Here, the energy may be represented as decibel (dB=10 log(E/T)) that is a unit of audio magnitude that a user perceives.

In operation 450, the determiner 230 may determine whether an AEC module is desired and/or required based on at least one of the delay D and the average energy in the echo section. For example, the determiner 230 may determine whether the AEC module is desired and/or required based on the delay D between two signals X and Y, which is determined in operation 410. For example, if the delay D does not continue with the same value in consecutive k frames in the echo section, the determiner 410 may determine that correlation between the two signals is low and may determine that the hardware AEC is provided or echo is not coming in. Here, k denotes a natural number of 2 or more. For example, k may be 2. Depending on example embodiments, k may have a value of 3 or more. In this case, the determiner 230 may determine that the AEC module is not desired and/or required. Also, if the average energy $\overline{Eecho_f}$ in the echo section determined in operation 440 is less than a preset first decibel value, for example, 30 dB corresponding to a first threshold value, the determiner 230 may determine that the hardware AEC is provided or echo is not coming in. Accordingly, even in this case, the determiner 230 may determine that the AEC module is not desired and/or required. When the AEC module is determined to not be desired and/or required, the determiner 230 may generate a signal for inactivating the AEC module and may transmit the generated signal to the activator 240. In this case, if the ACE module is in an activated state, the activator 240 may deactivate the AEC module in response to the received signal in operation 360 of FIG. 3.

Inversely, if the delay D is maintained with the same value in consecutive k frames and the average energy $\overline{Eecho_f}$ is greater than or equal to the first decibel value, the determiner 230 may determine that the AEC module is desired and/or required. In this case, the determiner 230 may generate a signal for activating the AEC module and the activator 240 may receive the generated signal. If the AEC module is in an deactivated state, the activator 240 may activate the AEC module in response to the received signal in operation 350 of FIG. 3.

In operation 460, the determiner 230 may determine whether an NS module is desired and/or required based on the average energy in the noise section.

For example, if the average energy in the noise section determined in operation 440 is less than a preset second decibel value, for example, 20 dB, corresponding to a second threshold value, the determiner 230 may determine that hardware NS is provided or noise is not coming in. In this case, the determiner 230 may determine that the NS module is not desired and/or required. As described above, when the NS module is determined to not be desired and/or required, the determiner 230 may generate a signal for inactivating the NS module and may transmit the generated signal to the activator 240. In this case, if the NS module is in an activated state, the activator 240 may activate the NS module in response to the received signal in operation 360 of FIG. 3.

If the average energy is greater than or equal to the second decibel value, the determiner 230 may determine that the NS module is desired and/or required. In this case, the determiner 230 may generate a signal for activating the NS module and may transmit the generated signal to the activator 240. In this case, if the NS module is in an deactivated state, the activator 240 may activate the NS module in response to the received signal in operation 350 of FIG. 3.

In operation 470, the determiner 230 may determine whether an AGC module is desired and/or required based on the average energy in the user input section.

For example, if the average energy $\overline{Euser_f}$ in the user input section determined in operation 440 is a value within a preset decibel range, for example, between 50 dB and 60 dB, the determiner 230 may determine that hardware AGC is provided or an appropriate volume of user input is coming in. In this case, the determiner 230 may determine that the AGC module is not desired and/or required. When the AGC module is determined to not be desired and/or required, the determiner 230 may generate a signal for inactivating the AGC module and may transmit the generated signal to the activator 240. In this case, if the AGC module is in an activated state, the activator 240 may deactivate the AGC module in response to the received signal in operation 360 of FIG. 3.

If the average energy $\overline{Euser_f}$ is a value outside the decibel range, the determiner 230 may determine that the AGC module is desired and/or required. Here, the determiner 230 may generate a signal for activating the AGC module and may transmit the generated signal to the activator 240. In this case, if the AGC module is in an deactivated state, the activator 240 may activate the AGC module in response to the received signal in operation 350 of FIG. 3.

The aforementioned k, first decibel value, second decibel value, and decibel range may be experimentally determined or may be determined based on the purpose of an application installed on the electronic device 100. The AEC module may be a module configured to estimate a linear characteristic of echo and to remove the estimated linear characteristic echo, and the NS module may be a module configured to estimate a noise level and to remove the estimated noise. Also, the AGC module may be a module configured to adjust gain. The AEC module, the NS module, and the AGC module may be softwarely configured and included in the application.

Figure 5:
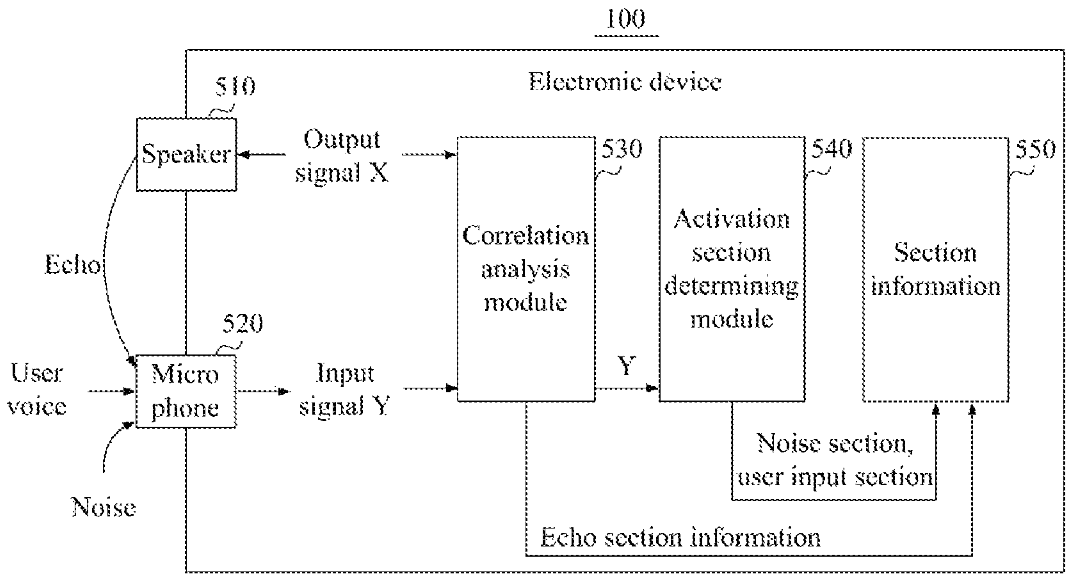
FIG. 5 is a diagram illustrating an example of a process of activating a software audio quality enhancement function according to at least one example embodiment.

FIG. 5 is a diagram illustrating an example of a process of activating a software audio quality enhancement function according to at least one example embodiment. Referring to FIG. 5, the electronic device 100 may include a speaker 510 and a microphone 520 as the I/O device 160, or may be connected to the speaker 510 and the microphone 520. Sound may be output through the speaker 510 in response to an output signal. Here, in addition to near-end speech such as user voice, echo and noise associated with the sound output through the speaker 510 may be further input to the microphone 520.

A computer program installed on the electronic device 100 may receive and analyze an output signal X of the speaker 510 and an input signal Y of the microphone 520, and may determine whether a software audio quality enhancement function is desired and/or required based on an analysis result.

A correlation analysis module 530 and an activation section determining module 540 may be configured using codes of a computer program that includes an instruction for the determiner 230 to perform operation 330 of FIG. 3 and operations 410 through 470 of FIG. 4.

The determiner 230 may determine an echo section by analyzing a correlation between the output signal X and the input signal Y under control of the correlation analysis module 530. Also, the determiner 230 may determine a noise section and a user input section using the input signal Y under control of the activation section determining module 540.

The determiner 230 may calculate the average energy according to section information 550 based on the section information 550 that is generated under control of the computer program. The determiner 230 may determine whether to activate at least one of the aforementioned AEC module, NS module, and AGC module based on the calculated average energy, and the activator 240 may activate a module of which activation is determined and may activate or deactivate an audio quality enhancement function in real time in order to not overlap a hardware audio quality enhancement function or to acquire further enhanced audio quality although the hardware audio quality enhancement function is executed.

According to some example embodiments, it is possible to selectively activate or deactivate a software audio quality enhancement function by analyzing a microphone input signal and a speaker output signal and by determining whether the software audio quality enhancement function is desired and/or required in real time.

The units described herein may be implemented using hardware components or a combination of hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as Blu-ray, CD-ROM and DVD disks; magneto-optical media such as floptical disks; and hardware devices that are specially to store and perform program instructions, such as read-only memory (ROM), random access memory (RAM, flash memory, etc.) and the like. Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-transitory computer-readable recording medium storing computer readable instructions that, when executed by at least one processor, cause the at least one processor to perform an audio quality enhancement method included in an electronic device, the method comprising:

analyzing a microphone input signal that is input to the electronic device and a speaker output signal that is output from the electronic device;

determining whether a software audio quality enhancement function is desired based on results of the analyzing the microphone input signal and the speaker output signal, the determining including determining an echo section based on the results of the analyzing the microphone input signal and the speaker output signal, and determining a continuity of delay between the microphone input signal and the speaker output signal, the continuity of delay indicating that a delay value for each frame unit is maintained to be the same when each of the microphone input signal and the speaker output signal is divided based on a frame unit with a desired size; and activating the software audio quality enhancement function based on a result of the determining whether the software audio quality enhancement function is desired, the activating the software audio quality enhancement function including determining whether an acoustic echo cancellation (AEC) module is desired based on results of the determining the continuity of delay.

2. The non-transitory computer-readable recording medium of claim 1, wherein the software audio quality enhancement function comprises the acoustic echo cancellation (AEC) module, a noise suppression (NS) module, and an automatic gain control (AGC) module; and the determining whether the software audio quality enhancement function is desired comprises determining whether at least one module of the AEC module, the NS module, and the AGC module is desired; and the activating comprises activating the determined at least one module based on a result of determining whether the at least one module of the AEC module, the NS module, and the AGC module is desired.

3. The non-transitory computer-readable recording medium of claim 1, wherein the determining whether the software audio quality enhancement function is desired comprises:

calculating an average energy of the determined echo section; and determining whether the acoustic echo cancellation (AEC) module is desired as the software audio quality enhancement function based on the results of the determining the continuity of delay or the calculated average energy of the determined echo section and a desired first threshold value.

4. The non-transitory computer-readable recording medium of claim 3, wherein the determining of the echo section comprises:

analyzing a correlation between the microphone input signal and the speaker output signal during an activation section of the speaker output signal; and determining the echo section based on results of the analyzing the correlation.

5. The non-transitory computer-readable recording medium of claim 3, wherein the determining whether the software audio quality enhancement function is desired comprises:

determining, as a user input section, a section in which energy of the microphone input signal is greater than a multiplication between an average energy of the microphone input signal and a desired first weight in a remaining section, the remaining section excluding the determined echo section from the entire section of the microphone input signal and the speaker output signal;

calculating an average energy of the determined user input section; and determining whether an automatic gain control (AGC) module is desired as the software audio quality enhancement function based on whether the calculated average energy of the determined user input section belongs to a desired range.

6. The non-transitory computer-readable recording medium of claim 5, wherein the determining whether the software audio quality enhancement function is desired comprises:

determining, as a noise section, a section in which the energy of the microphone input signal is less than a multiplication between an average energy of the microphone input signal and a desired second weight in the remaining section, the remaining section excluding the determined echo section and the determined user input section from the entire section;

calculating an average energy of the determined noise section; and determining whether a noise suppression (NS) module is desired as the software audio quality enhancement function based on the calculated average energy of the determined noise section and a desired second threshold value.

7. A method for audio quality enhancement, the method comprising:

analyzing, using at least one processor, a microphone input signal that is input to an electronic device and a speaker output signal that is output from the electronic device;

determining, using the at least one processor, whether a software audio quality enhancement function is desired based on results of the analyzing the microphone input signal and the speaker output signal, the determining including determining an echo section based on the results of the analyzing the microphone input signal and the speaker output signal, and determining a continuity of delay between the microphone input signal and the speaker output signal, the continuity of delay indicating that a delay value for each frame unit is maintained to be the same when each of the microphone input signal and the speaker output signal is divided based on a frame unit with a desired size; and activating, using the at least one processor, the software audio quality enhancement function based on a result of determining whether the software audio quality enhancement function is desired, the activating the software audio quality enhancement function including determining whether an acoustic echo cancellation (AEC) module is desired based on results of the determining the continuity of delay.

8. The method of claim 7, wherein the software audio quality enhancement function comprises the acoustic echo cancellation (AEC) module, a noise suppression (NS) module, and an automatic gain control (AGC) module; and the determining whether the software audio quality enhancement function is desired comprises determining whether at least one module of the AEC module, the NS module, and the AGC module is desired; and the activating comprises activating the determined at least one module based on a result of determining whether the at least one module of the AEC module, the NS module, and the AGC module is desired.

9. The method of claim 7, wherein the determining whether the software audio quality enhancement function is desired comprises:

calculating an average energy of the determined echo section; and determining whether the acoustic echo cancellation (AEC) module is desired as the software audio quality enhancement function based on the results of the determining the continuity of delay or the calculated average energy of the determined echo section and a desired first threshold value.

10. The method of claim 9, wherein the determining whether the software audio quality enhancement function is desired comprises:

determining, as a user input section, a section in which energy of the microphone input signal is greater than a multiplication between an average energy of the microphone input signal and a desired first weight in a remaining section, the remaining section excluding the determined echo section from the entire section of the microphone input signal and the speaker output signal;

calculating an average energy of the determined user input section; and determining whether an automatic gain control (AGC) module is desired as the software audio quality enhancement function based on whether the calculated average energy of the determined user input section belongs to a desired range.

11. The method of claim 10, wherein the determining whether the software audio quality enhancement function is desired comprises:

determining, as a noise section, a section in which the energy of the microphone input signal is less than a multiplication between an average energy of the microphone input signal and a desired second weight in a remaining section, the remaining section excluding the determined echo section and the determined user input section from the entire section;

calculating an average energy of the determined noise section; and determining whether an noise suppression NS module is desired as the software audio quality enhancement function based on the calculated average energy of the determined noise section and a desired second threshold value.

12. An electronic device comprising:

a memory configured to store computer-readable instructions; and at least one processor configured to execute the computer-readable instructions to, analyze a microphone input signal that is input to the electronic device and a speaker output signal that is output from the electronic device, determine whether a software audio quality enhancement function is desired based on results of the analyzing the microphone input signal and the speaker output signal, the determining including determining an echo section based on the results of the analyzing the microphone input signal and the speaker output signal, and determining a continuity of delay between the microphone input signal and the speaker output signal, the continuity of delay indicating that a delay value for each frame unit is maintained to be the same when each of the microphone input signal and the speaker output signal is divided based on a frame unit with a desired size, and activate the software audio quality enhancement function based on a result of the determining whether the software audio quality enhancement function is desired, the activating the software audio quality enhancement function including determining whether an acoustic echo cancellation (AEC) module is desired based on results of the determining the continuity of delay.

13. The electronic device of claim 12, wherein the software audio quality enhancement function comprises the acoustic echo cancellation (AEC) module, a noise suppression (NS) module, and an automatic gain control (AGC) module; and the at least one processor is further configured to, determine whether the software audio quality enhancement function is desired by determining whether at least one module of the AEC module, the NS module, and the AGC module is desired, and activate the software audio quality enhancement function by activating the determined at least one module based on a result of the determining whether the at least one module of the AEC module, the NS module, and the AGC module is desired.

14. The electronic device of claim 12, wherein, to determine whether the software audio quality enhancement function is desired, the at least one processor is configured to:

calculate an average energy of the determined echo section; and determine whether an acoustic echo cancellation (AEC) module is desired as the software audio quality enhancement function based on the results of the determining the continuity of delay or the calculated average energy of the determined echo section and a desired first threshold value.

15. The electronic device of claim 14, wherein, to determine whether the software audio quality enhancement function is desired, the at least one processor is configured to:

determine, as a user input section, a section in which energy of the microphone input signal is greater than a multiplication between an average energy of the microphone input signal and a desired first weight in a remaining section, the remaining section excluding the determined echo section from the entire section of the microphone input signal and the speaker output signal;

calculate an average energy of the determined user input section; and determine whether an automatic gain control (AGC) module is desired as the software audio quality enhancement function based on whether the calculated average energy of the determined user input section belongs to a desired range.

16. The electronic device of claim 15, wherein, to determine whether the software audio quality enhancement function is desired, the at least one processor is configured to:

determine, as a noise section, a section in which the energy of the microphone input signal is less than a multiplication between the average energy of the microphone input signal and a desired second weight in a remaining section, the remaining section excluding the determined echo section and the determined user input section from the entire section;

calculate an average energy of the determined noise section; and determine whether a noise suppression (NS) module is desired as the software audio quality enhancement function based on the calculated average energy of the determined noise section and a desired second threshold value.

* * * * *